United States Patent
Ho et al.

(10) Patent No.: US 10,205,487 B1
(45) Date of Patent: Feb. 12, 2019

(54) WIRELESS POWER CONSORTIUM DEVICE AND METHOD FOR MANUFACTURING THE SAME

(71) Applicants: Avary Holding (Shenzhen) Co., Limited., Shenzhen (CN); HongQiSheng Precision Electronics (QinHuangDao) Co., Ltd., Qinhuangdao (CN)

(72) Inventors: Ming-Jaan Ho, Tu-Cheng (TW); Xian-Qin Hu, Shenzhen (CN); Fu-Yun Shen, Shenzhen (CN)

(73) Assignees: Avary Holding (Shenzhen) Co., Limited., Shenzhen (CN); HongQiSheng Precision Electronics (QinHuangDao) Co, Qinhuangdao (CN)

( * ) Notice: Subject to any disclaimer, the term of this patent is extended or adjusted under 35 U.S.C. 154(b) by 0 days.

(21) Appl. No.: 15/870,882

(22) Filed: Jan. 13, 2018

(30) Foreign Application Priority Data

Nov. 20, 2017 (CN) .......................... 2017 1 1160344

(51) Int. Cl.
H04B 5/00 (2006.01)
H02J 50/20 (2016.01)

(52) U.S. Cl.
CPC ............ *H04B 5/0037* (2013.01); *H02J 50/20* (2016.02)

(58) Field of Classification Search
CPC combination set(s) only.
See application file for complete search history.

(56) References Cited

U.S. PATENT DOCUMENTS

| 9,735,606 | B2 * | 8/2017 | Koyanagi | H02J 7/025 |
| 2014/0210406 | A1 * | 7/2014 | Na | H02J 5/005 320/108 |
| 2015/0054455 | A1 * | 2/2015 | Kim | H02J 17/00 320/108 |
| 2016/0164334 | A1 * | 6/2016 | Gu | H02J 17/00 320/108 |

(Continued)

FOREIGN PATENT DOCUMENTS

| CN | 106329114 A | * | 1/2017 | |
| KR | 20130024757 A | * | 3/2013 | H02J 5/005 |

(Continued)

OTHER PUBLICATIONS

Zhang Bo, CN-106329114-A Translation, Jan. 2017 (Year: 2017).*
Lim Jong Gae, KR-20160118778-A Translation, Oct. 2016 (Year: 2016).*

*Primary Examiner* — Nay A Maung
*Assistant Examiner* — Erica L Fleming-Hall
(74) *Attorney, Agent, or Firm* — ScienBiziP, P.C.

(57) ABSTRACT

A wireless power consortium device includes a flexible substrate layer, at least one first WPC coil on the flexible substrate layer, at least one first NFC coil on the flexible substrate layer, at least one WPC module, and at least one NFC module. Each WPC module comprises a first matching circuit and a WPC power supply chip electrically connected to the first matching circuit. Each NFC module comprises a second matching circuit and an NFC controlling chip electrically connected to the second matching circuit. The first matching circuit and the second matching circuit are different parts of one circuit and are formed on the flexible substrate layer.

20 Claims, 7 Drawing Sheets

(56) References Cited

U.S. PATENT DOCUMENTS

| | | | | |
|---|---|---|---|---|
| 2017/0054213 | A1* | 2/2017 | Singh | H01Q 7/06 |
| 2017/0213644 | A1* | 7/2017 | Lee | H01F 38/14 |
| 2017/0338562 | A1* | 11/2017 | Ozenne | G06K 7/10356 |
| 2017/0353055 | A1* | 12/2017 | Han | H02J 50/12 |
| 2017/0365393 | A1* | 12/2017 | Kim | H01F 38/14 |
| 2018/0205142 | A1* | 7/2018 | Jung | H01F 10/08 |

FOREIGN PATENT DOCUMENTS

| | | | |
|---|---|---|---|
| KR | 101505456 | B1 * | 3/2015 |
| KR | 20160118778 | A * | 10/2016 |
| KR | 20170045601 | A * | 4/2017 |

* cited by examiner

WIRELESS POWER CONSORTIUM DEVICE AND METHOD FOR MANUFACTURING THE SAME

FIELD

The subject matter generally relates to a wireless power consortium device and method for manufacturing the same.

BACKGROUND

Now, the near field communication (NFC) coil and the wireless power consortium (WPC) coil are generally set in the case back cover. But the thickness of the product is increased and does not meet the thinness trend of electronic products. There are also high-end electronic products such as high-end mobile phones that integrate the NFC coils and the WPC coils with flexible substrates. However, important chips are still installed on the motherboard, which is detrimental to evaluation and debugging, and takes a long time to develop. Improvement in the art is preferred.

BRIEF DESCRIPTION OF THE DRAWINGS

Implementations of the present disclosure will now be described, by way of example only, with reference to the attached figures.

DETAILED DESCRIPTION OF EMBODIMENTS

Figure 1:
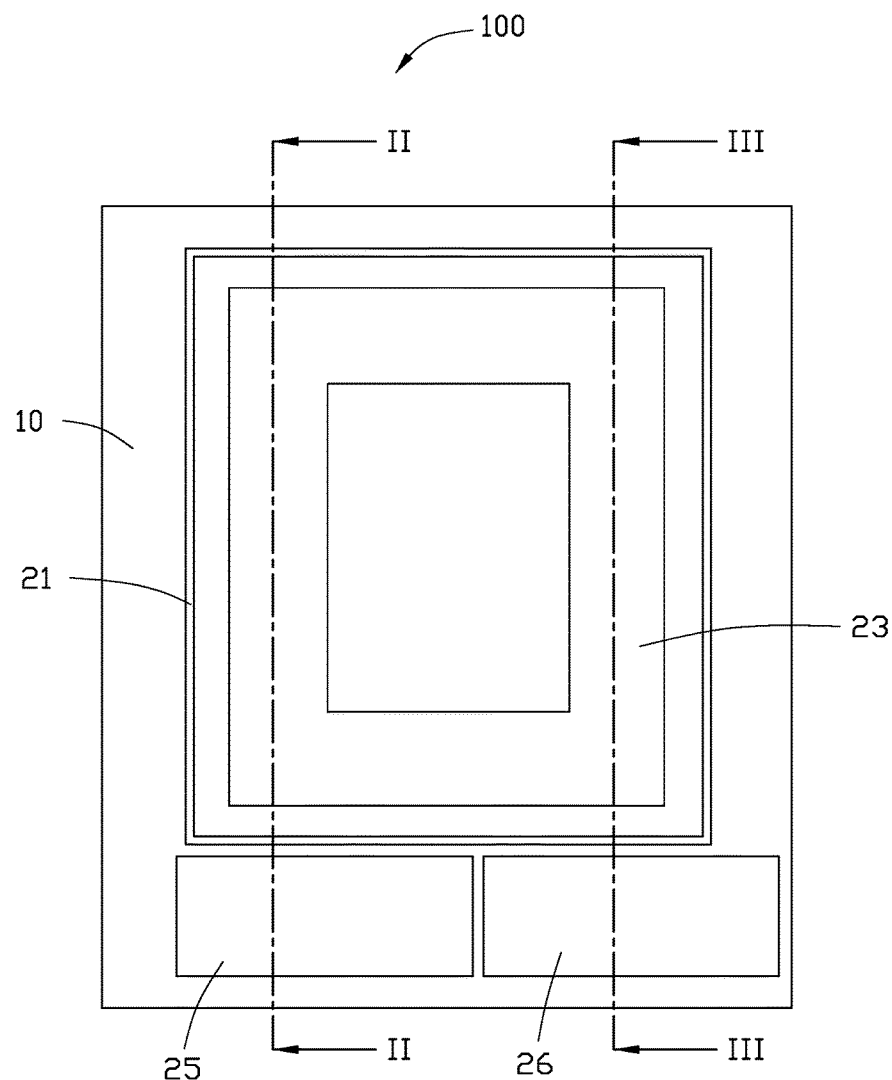
FIG. 1 is a top view of an exemplary embodiment of a wireless power consortium device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 2:
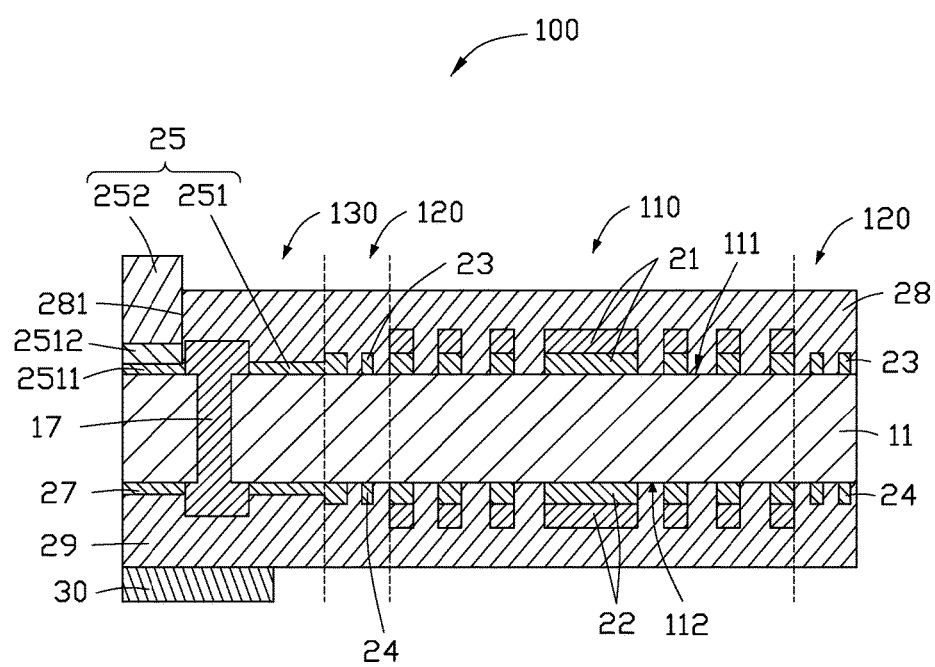
FIG. 2 is a cross-sectional view taken along line II-II of FIG. 1.
Figure 3:
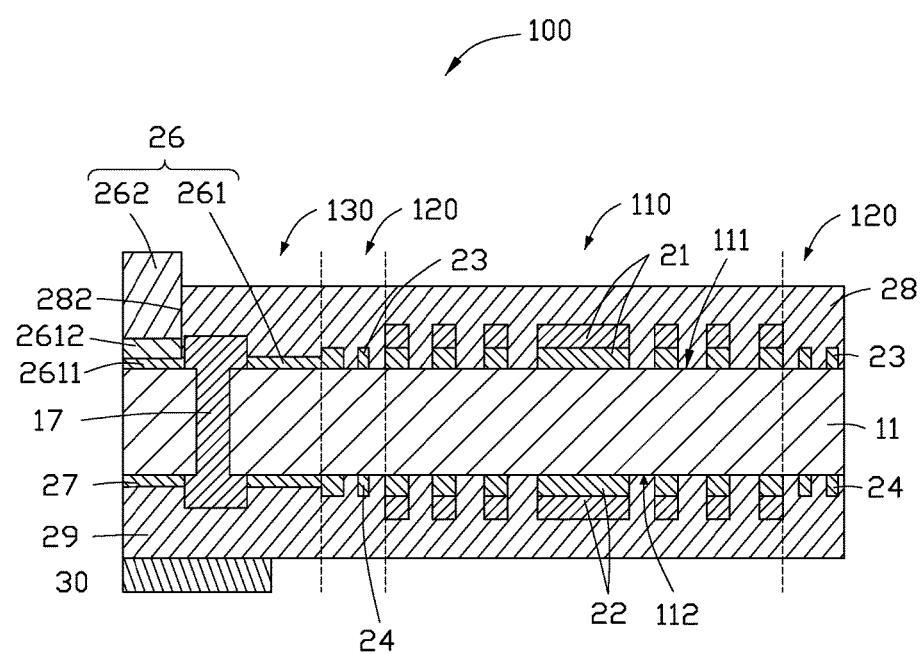
FIG. 3 is a cross-sectional view taken along line of FIG. 1.

FIGS. 1 to 3 illustrate an exemplary embodiment of a wireless power consortium device 100. The wireless power consortium device 100 is used to receive an external radio frequency signal and to receive power for battery charging from external charging equipment.

The wireless power consortium device 100 defines a WPC coil area 110, an NFC coil area 120, and a matching line area 130. The NFC coil area 120 surrounds the WPC coil area 110. The matching line area 130 surrounds the NFC coil area 120.

In at least one exemplary embodiment, the wireless power consortium device 100 includes a flexible substrate layer 11, at least one first WPC coil 21, at least one first NFC coil 23, at least one WPC module 25, and at least one NFC module 26.

The flexible substrate layer 11 is a material selected from a group consisting of the polyimide (PI), polyethylene terephthalate (PET), polyethylene naphthalate (PEN), polyethylene (PE), Teflon, liquid crystal polymer (LCP), polyvinyl chloride polymer (PVC), and a combination thereof.

The flexible substrate layer 11 includes a first surface 111 and a second surface 112 facing away from the first surface 111. The at least one first WPC coil 21, the at least one first NFC coil 23, the at least one WPC module 25, and the at least one NFC module 26 are all formed on the first surface 111.

The at least one first WPC coil 21 lies in the WPC coil area 110. The at least one first NFC coil 23 lies in the NFC coil area 120. The at least one WPC module 25 and the at least one NFC module 26 lie in the matching line area 130.

The at least one first NFC coil 23 surrounds the at least one first WPC coil 21. The at least one WPC module 25 and the at least one NFC module 26 lie on outside of the at least one first NFC coil 23. The WPC module 25 is adjacent to the NFC module 26.

A thickness of the at least one first WPC coil 21 is equal to or greater than 55 micrometers. A thickness of the at least one first NFC coil 23 is equal to or less than 35 micrometers.

Each of the at least one WPC module 25 includes a first matching circuit 251 and a WPC power supply chip 252. The WPC power supply chip 252 is electrically connected to the first matching circuit 251. A thickness of the first matching circuit 251 is equal to or less than 18 micrometers.

Each of the at least one NFC module 26 includes a second matching circuit 261 and an NFC controlling chip 262. The NFC controlling chip 262 is electrically connected to the second matching circuit 261.

The first matching circuit 251 and the second matching circuit 261 are different parts of one circuit. That is, the first matching circuit 251 and the second matching circuit 261 are all formed on the first surface 111 and lie in the matching line area 130. A thickness of the second matching circuit 261 is equal to or less than 18 micrometers.

The wireless power consortium device 100 further includes at least one second WPC coil 22, at least one second NFC coil 24, and a third matching circuit 27. The second WPC coil 22, the second NFC coil 24, and the third matching circuit 27 are formed on the second surface 112.

The second WPC coil 22 faces away from the first WPC coil 21. The second NFC coil 24 faces away from the first NFC coil 23. The third matching circuit 27 faces away from the first matching circuit 251 and the second matching circuit 261.

A thickness of the second WPC coil 22 is equal to a thickness of the first WPC coil 21.

A thickness of the second NFC coil 24 is equal to a thickness of the first NFC coil 23.

A thickness of the second WPC coil 22 is equal to or more than 55 micrometers.

A thickness of the second NFC coil 24 is equal to or less than 35 micrometers.

A thickness of the third matching circuit 27 is equal to or less than 18 micrometers.

The wireless power consortium device 100 further includes at least one conductive through hole 17.

The conductive through hole 17 is electrically connected to the first matching circuit 251, the second matching circuit 261, and the third matching circuit 27.

The wireless power consortium device 100 further includes a first covering layer 28 and a second covering layer 29.

The first covering layer 28 covers the first WPC coil 21, the first NFC coil 23, the first matching circuit 251, and the second matching circuit 261.

The second covering layer 29 covers the second WPC coil 22, the second NFC coil 24, and the third matching circuit 27.

The first covering layer 28 includes at least one first opening 281 and at least one second opening 282.

A portion of the first matching circuit 251 is exposed from the at least one first opening 281, a portion of the second matching circuit 261 is exposed from the at least one second opening 282.

The first covering layer 28 includes at least one first opening 281 and at least one second opening 282.

A portion of the first matching circuit 251 is exposed from the at least one first opening 281, a portion of the second matching circuit 261 is exposed from the at least one second opening 282.

A first pad 2511 of the wireless power consortium device 100 defines the portion of the first matching circuit 251 which is exposed from the at least one first opening 281.

A second pad 2611 of the wireless power consortium device 100 defines the portion of the second matching circuit 261 exposed from the at least one second opening 282.

The second pad 2611 is used to mount the at least one NFC controlling chip 262.

A first gold layer 2512 is formed on the first pad 2511. The first gold layer 2512 is used to protect the first pad 2511.

A second gold layer 2612 is formed on the second pad 2611. The second gold layer 2612 is used to protect the second pad 2612.

The wireless power consortium device 100 further includes at least one first reinforcing board 30 and at least one second reinforcing board 40.

The at least one first reinforcing board 30 and the second reinforcing board 40 are formed on the second covering layer 29 and reinforce the flexible substrate 11.

The first reinforcing board 30 faces away from the first pad 2511. The second reinforcing board 40 faces away from the second pad 2611.

In other exemplary embodiment, the wireless power consortium device 100 does not include the second WPC coil 22, the second NFC coil 24, the third matching circuit 27, and the second covering layer 29.

Figure 4:
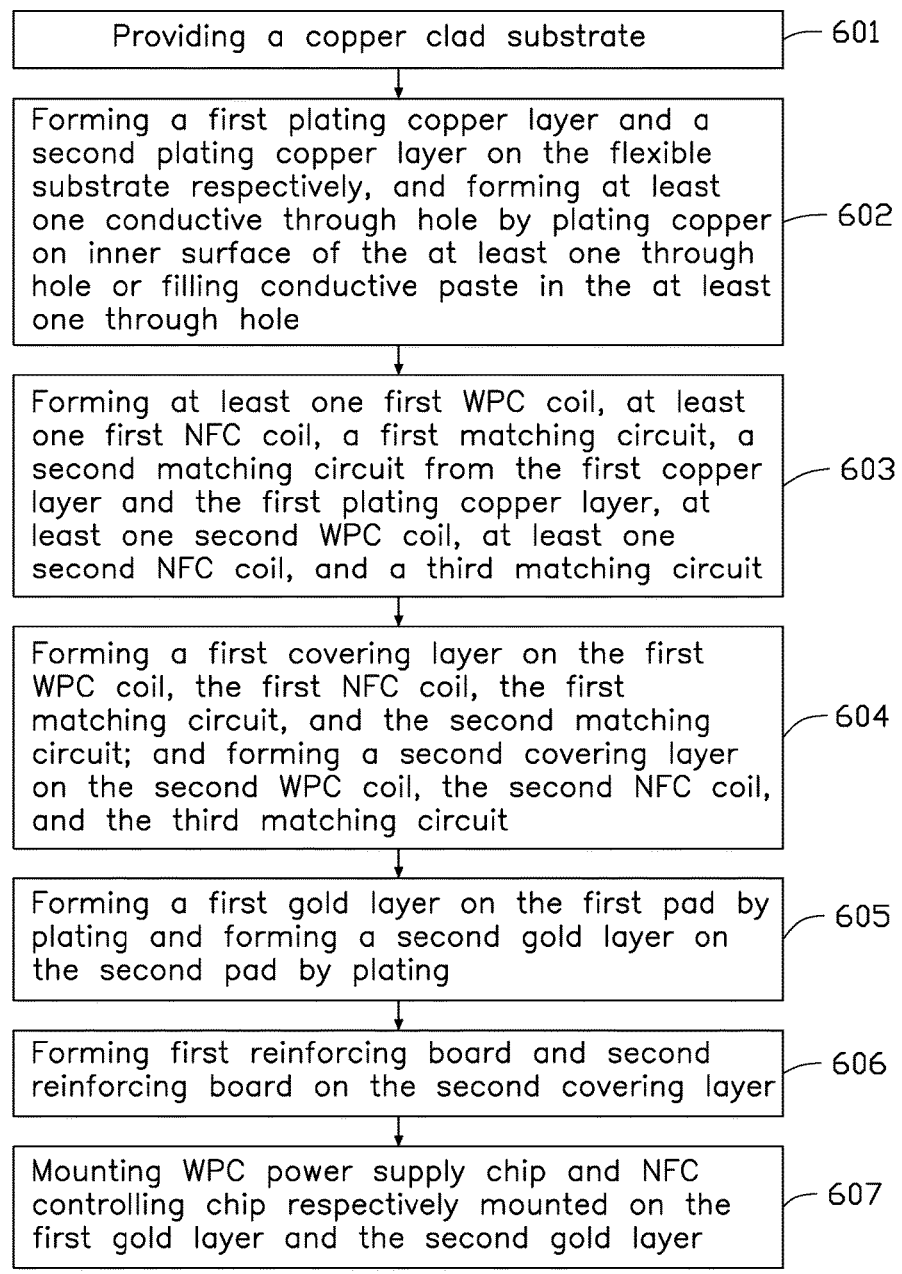
FIG. 4 is a flowchart of an exemplary embodiment of a method for manufacturing the wireless power consortium device of FIG. 1.

FIG. 4 illustrates a flowchart of a method for manufacturing a wireless power consortium device 100. The method is provided by way of example, as there are a variety of ways to carry out the method. The method described below can be carried out using the configurations illustrated in FIGS. 1-3, for example, and various elements of these figures are referenced in explaining example method. Each block shown in FIG. 4 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 601.

Figure 5:
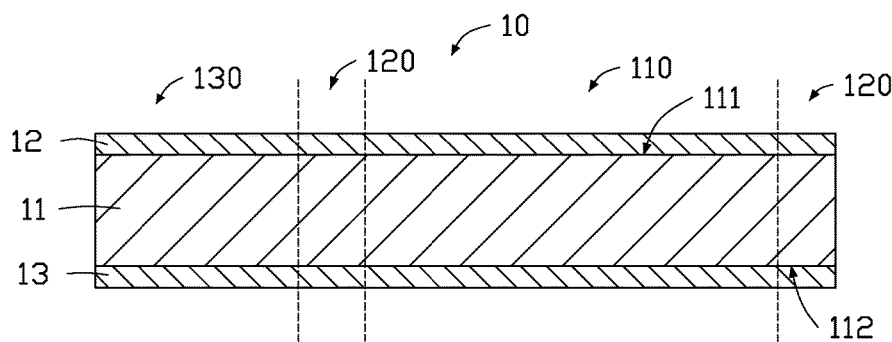
FIG. 5 is a cross-sectional view of a clad substrate according to the present disclosure.
Figure 6:
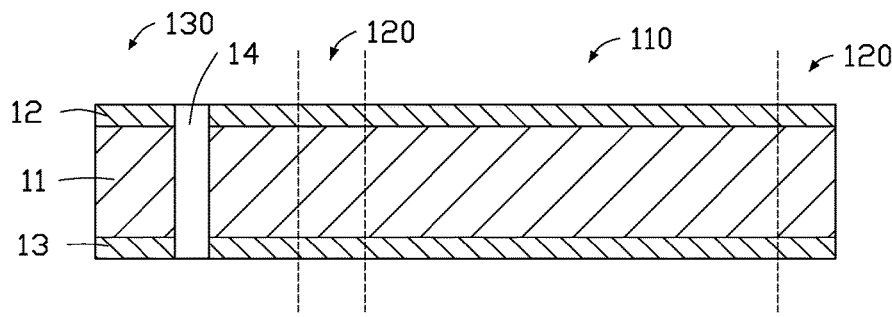
FIG. 6 is a cross-sectional view showing through holes in the double-sided copper clad substrate of FIG. 5.

At block 601, also illustrated by FIGS. 5-6, a copper clad substrate 10 is provided.

The copper clad substrate 10 can be a double-sided copper clad substrate or a single-sided copper clad substrate. In at least one exemplary embodiment, the copper clad substrate 10 is a double-sided copper clad substrate.

The copper clad substrate 10 includes a flexible substrate layer 11, a first copper layer 12, and a second copper layer 13.

The flexible substrate layer 11 is a material selected from a group consisting of the polyimide (PI), polyethylene terephthalate (PET), polyethylene naphthalate (PEN), polyethylene (PE), Teflon, liquid crystal polymer (LCP), polyvinyl chloride polymer (PVC), and a combination thereof.

The flexible substrate layer 11 includes a first surface 111 and a second surface 112 facing away from the first surface 111. The first copper layer 12 is formed on the first surface 111. The second copper layer 13 is formed on the second surface 112.

The copper clad substrate 10 defines a WPC coil area 110, an NFC coil area 120, and a matching line area 130. The NFC coil area 120 surrounds the WPC coil area 110. The matching line area 130 surrounds the NFC coil area 120.

The copper clad substrate 10 further includes at least one through hole 14 running through the copper clad substrate 10.

The at least one through hole 14 is formed by mechanical drilling or laser drilling. In at least one exemplary embodiment, the at least one through hole 14 is formed by mechanical drilling.

Figure 7:
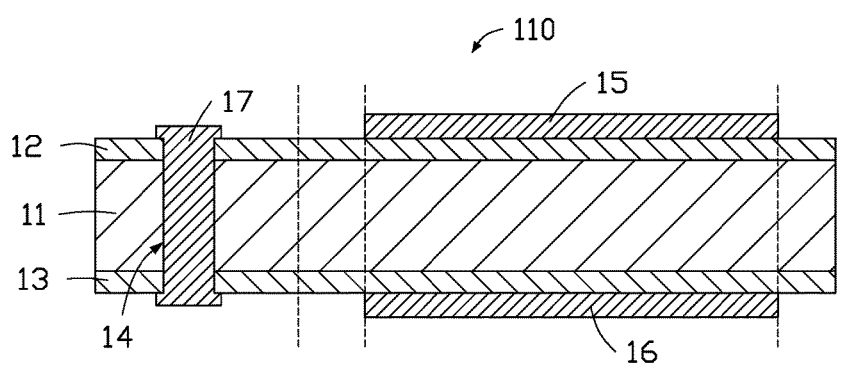
FIG. 7 is a cross-sectional view showing plated copper layer formed on the clad substrate of FIG. 5.

At block 602, also illustrated by FIG. 7, a first plated copper layer 15 and a second plated copper layer 16 are formed on the copper clad substrate 10. At least one conductive through hole 17 is formed by plating copper on inner surface of the at least one through hole 14 or infilling conductive paste in the at least one through hole 14.

The first plated copper layer 15 is formed on a surface of the first copper layer 12 facing away from the flexible substrate 11, and the second plated copper layer 16 is formed on a surface of the second copper layer 13 facing away from the flexible substrate 11.

The first plated copper layer 15 and the second plated copper layer 16 lie in the WPC coil area 110.

Figure 8:
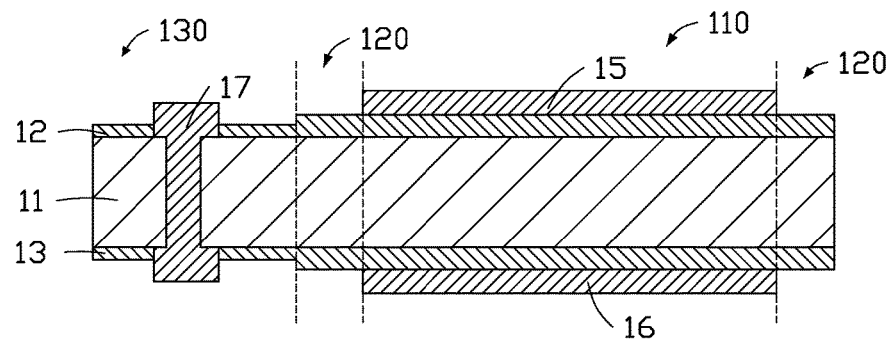
FIG. 8 is a cross-sectional view showing the plated copper layer of FIG. 7 reduced.
Figure 9:
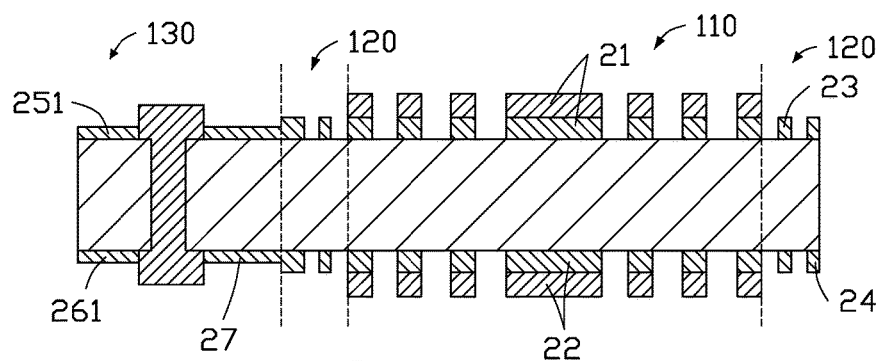
FIG. 9 is a cross-sectional view showing NFC coils, WPC coils and matching lines.

At block 603, also illustrated by FIGS. 8-9, at least one first WPC coil 21, at least one first NFC coil 23, a first matching circuit 251, a second matching circuit 261, at least one second WPC coil 22, at least one second NFC coil 24, and a third matching circuit 27 are formed.

First, illustrated by FIG. 8, the first copper layer 12 and the second copper layer 13 are locally reduced by etching.

The first plated copper layer 15 and the second plated copper layer 16 lying in the WPC coil area 110 are not etched. The first copper layer 12 and the second copper layer 13 lying in the NFC coil area 120 are not etched. The first copper layer 12 and the second copper layer 13 lying in the matching line area 130 are locally etched.

A sum of thicknesses of the first copper layer 12 and the first plated copper layer 15 lying in the WPC coil area 110 is equal to or greater than 55 micrometers. A sum of thicknesses of the second copper layer 13 and the second plated copper layer 16 lying in the WPC coil area 110 is equal to or greater than 55 micrometers. A thickness of the first copper layer 12 lying in the NFC coil area 120 is equal to or less than 35 micrometers. A thickness of the second copper layer 13 lying in the NFC coil area 120 is equal to or less than 35 micrometers. A thickness of the first copper layer 12 being etched and lying in the matching line area 130 is equal to or less than 18 micrometers. A thickness of the second copper layer 13 being etched and lying in the matching line area 130 is equal to or less than 18 micrometers.

Second, illustrated by FIG. 9, at least one first WPC coil 21, at least one first NFC coil 23, a first matching circuit 251, and a second matching circuit 261 are made from the first copper layer 12 and the first plated copper layer 15 in FIG. 8. At least one second WPC coil 22, at least one second NFC coil 24, and a third matching circuit 27 are made from the second copper layer 13 and the second plated copper layer 16 in FIG. 8.

The at least one first WPC coil 21 and the second WPC coil 22 lie in the WPC coil area 110. The at least one first NFC coil 23 and the second NFC coil 24 lie in the NFC coil area 120. The first matching circuit 251, the second matching circuit 261 and the third matching circuit 27 lie in the matching line area 130.

The at least one first NFC coil 23 surrounds the at least one first WPC coil 21. The first matching circuit 251 and the second matching circuit 261 lie on outside of the at least one first NFC coil 23.

In at least one exemplary embodiment, the first matching circuit 251 and the second matching circuit 261 are different parts of one circuit.

The second WPC coil 22 faces away from the first WPC coil 21. The second NFC coil 24 faces away from the first NFC coil 23. The third matching circuit 27 faces away from the first matching circuit 251 and the second matching circuit 261.

Figure 10:
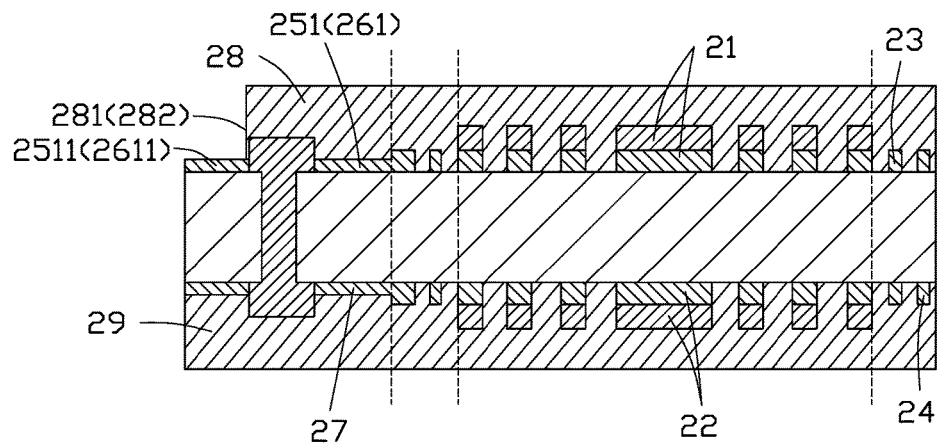
FIG. 10 is a cross-sectional view showing covering layers formed on the NFC coils, the WPC coils and the matching line according to FIG. 8.

At block 604, also illustrated by FIG. 10, a first covering layer 28 is formed on the first WPC coil 21, the first NFC coil 23, the first matching circuit 251, and the second matching circuit 261. A second covering layer 29 is formed on the second WPC coil 22, the second NFC coil 24, and the third matching circuit 27.

The first covering layer 28 includes at least one first opening 281 and at least one second opening 282. A portion of the first matching circuit 251 is exposed from the at least one first opening 281, a portion of the second matching circuit 261 is exposed from the at least one second opening 282.

A first pad 2511 of the WPC device 100 defines the portion of the first matching circuit 251 exposed from the at least one first opening 281.

A second pad 2611 of the WPC device 100 defines the portion of the second matching circuit 261 exposed from the at least one second opening 282.

Figure 11:
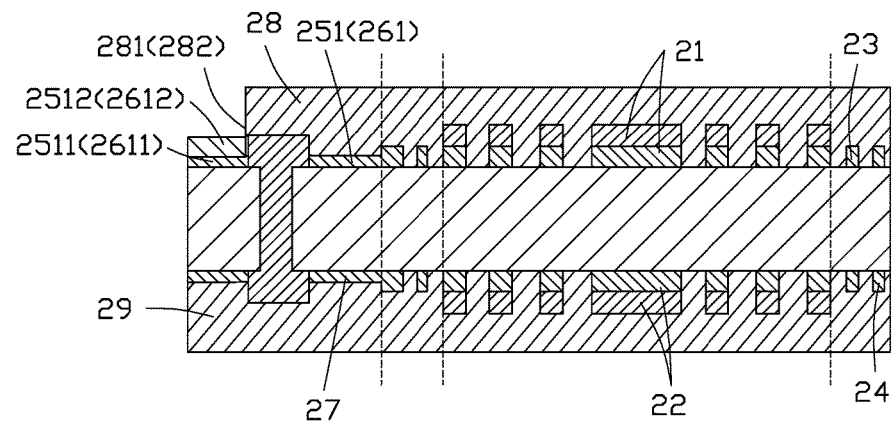
FIG. 11 is a cross-sectional view showing a first gold layer and a second layer are formed on the matching line of FIG. 9.

At block 605, also illustrated by FIG. 11, a first gold layer 2512 is formed on the first pad 2511 by plating and a second gold layer 2612 is formed on the second pad 2611 by plating.

The first gold layer 2512 is used to protect the first pad 2511, and the second gold layer 2612 is used to protect the second pad 2612.

Figure 12:
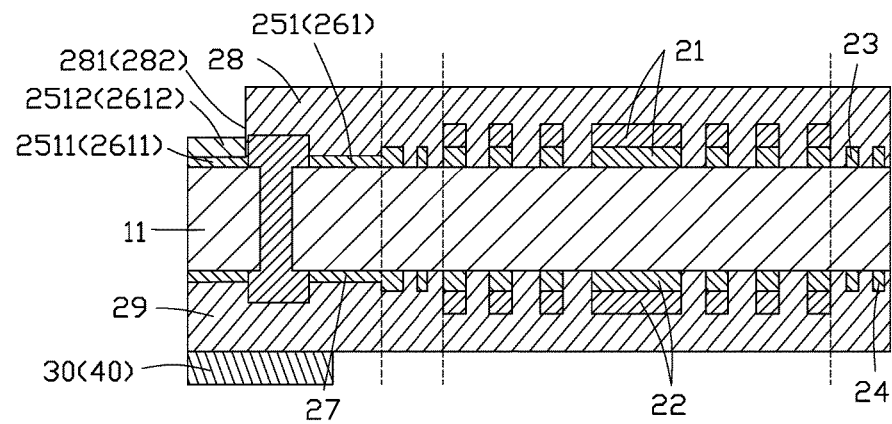
FIG. 12 is a cross-sectional view showing a reinforcing board formed on the back of the matching lines of FIG. 9.

At block 606, also illustrated by FIG. 12, at least one first reinforcing board 30 and at least one second reinforcing board 40 are formed on the second covering layer 29.

The first reinforcing board 30 faces away from the first pad 2511 and the second reinforcing board 40 faces away from the second pad 2611.

The at least one first reinforcing board 30 and the second reinforcing board 40 are used to reinforce the flexible substrate 11.

At block 607, also illustrated by FIGS. 1-3, at least one WPC power supply chip 252 and at least one NFC controlling chip 262 are respectively mounted on the first gold layer 2512 and the second gold layer 2612.

With the above configuration, in the wireless power consortium device 100 and the method for manufacturing the same, the at least one WPC power supply chip 252 and the corresponding first matching circuit 251 are integrated into the WPC module 25. The at least one NFC controlling chip 262 and the second matching circuit 261 are integrated into the NFC module 26, so that the at least one WPC power supply chip 252, the at least one NFC controlling chip 262, the first WPC coil 21, the second WPC coil 22, the first NFC coil 23, and the second NFC coil 24 are closely integrated on the flexible substrate 11. Thus, firstly, evaluation and debugging of the overall function can be carried out quickly; secondly, the WPC module 25 and the NFC module 26 can be evaluated separately and can reduce development time; and thirdly, the WPC module 25 and the NFC module 26 lead to a reduced thickness of this and similar products.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A wireless power consortium device, comprising:
   a flexible substrate layer;
   at least one first wireless power consortium (WPC) coil being formed on the flexible substrate layer;
   at least one first near field communication (NFC) coil being formed on the flexible substrate layer; wherein the at least one first NFC coil surrounds the at least one first WPC coil;
   at least one WPC module being formed on the flexible substrate layer, wherein each of the at least one WPC module comprises a first matching circuit and a WPC power supply chip electrically connected to the first matching circuit; and
   at least one NFC module being formed on the flexible substrate layer, wherein each of the at least one NFC module comprises a second matching circuit and an NFC controlling chip electrically connected to the second matching circuit; wherein the first matching circuit and the second matching circuit are different parts of one circuit and are formed on the flexible substrate layer.

2. The wireless power consortium device of claim 1, the at least one WPC module and the at least one NFC module lie on outside of the at least one first NFC coil.

3. The wireless power consortium device of claim 1, wherein the WPC module is adjacent to the NFC module.

4. The wireless power consortium device of claim 1, wherein a thickness of the at least one first WPC coil is equal to or greater than 55 micrometers.

5. The wireless power consortium device of claim 1, wherein a thickness of the at least one first NFC coil is equal to or less than 35 micrometers.

6. The wireless power consortium device of claim 1, wherein a thickness of the first matching circuit is equal to or less than 18 micrometers.

7. The wireless power consortium device of claim 1, wherein a thickness of the second matching circuit is equal to or less than 18 micrometers.

8. The wireless power consortium device of claim 1, wherein the flexible substrate layer comprises a first surface and a second surface facing away from the first surface, the at least one first WPC coil, the at least one first NFC coil, the at least one WPC module, and the at least one NFC module are all formed on the first surface.

9. The wireless power consortium device of claim 8, wherein the wireless power consortium device further comprises at least one second WPC coil, at least one second NFC coil, and a third matching circuit; wherein the second WPC coil, the second NFC coil, and the third matching circuit are formed on the second surface.

10. The wireless power consortium device of claim 9, wherein the second WPC coil faces away from the first WPC coil, the second NFC coil faces away from the first NFC coil, the third matching circuit faces away from the first matching circuit and the second matching circuit.

11. The wireless power consortium device of claim 9, wherein a thickness of the second WPC coil is equal to a thickness of the first WPC coil; a thickness of the second NFC coil is equal to a thickness of the first NFC coil.

12. The wireless power consortium device of claim 9, wherein a thickness of the second WPC coil is equal to or more than 55 micrometers.

13. The wireless power consortium device of claim 9, wherein a thickness of the second NFC coil is equal to or less than 35 micrometers.

14. A method for manufacturing a wireless power consortium device, comprising:
providing a copper clad substrate comprising a flexible substrate layer and a first copper layer being formed on the flexible substrate layer; wherein the copper clad substrate defines a WPC coil area, an NFC coil area, and a matching line area, the NFC coil area surrounds the WPC coil area, the matching line area surrounds the NFC coil area;
forming a first plated copper layer on the first copper layer, wherein the first plated copper layer lies in the WPC coil area;
forming at least one first WPC coil lying the WPC coil area, at least one first NFC coil lying in the NFC coil area, a first matching circuit lying in the matching line area, and a second matching circuit lying in the matching line area from the first copper layer and the first plated copper layer; and
mounting at least one WPC power supply chip and at least one NFC controlling chip on the matching line area and respectively electrically connected to the first matching circuit and the second matching circuit respectively.

15. The method of claim 14, after forming a first plated copper layer on the first copper layer, wherein further comprises:
reducing the first copper layer and the second copper layer locally by etching.

16. The method of claim 15, wherein the first plated copper layer lying in the WPC coil area is not etched; the first copper layer lying in the NFC coil area is not etched; and the first copper layer lying in the matching line area is etched.

17. The method of claim 15, wherein a sum of thicknesses of the first copper layer and the first plated copper layer lying in the WPC coil area is equal to or greater than 55 micrometers; a thickness of the first copper layer lying in the NFC coil area is equal to or less than 35 micrometers; a thickness of the first copper layer being etched and lying in the matching line area is equal to or less than 18 micrometers.

18. The method of claim 14, wherein copper clad substrate further comprises a second copper layer facing away from the first copper layer; when forming the first plated copper layer, further comprises:
forming a second plated copper layer on the first copper layer, wherein the second plated copper layer lies in the WPC coil area and faces away from the first plated copper layer; when making at least one first WPC coil lying the WPC coil area, at least one first NFC coil lying in the NFC coil area, a first matching circuit lying in the matching line area, and a second matching circuit lying in the matching line area from the first copper layer and the first plated copper layer, further comprises:
making at least one second WPC coil lying the WPC coil area, at least one second NFC coil lying in the NFC coil area, and a third matching circuit lying in the matching line area from the second copper layer and the second plated copper layer.

19. The method of claim 18, wherein the second WPC coil faces away from the first WPC coil, the second NFC coil faces away from the first NFC coil, the third matching circuit faces away from the first matching circuit and the second matching circuit.

20. The method of claim 18, wherein a sum of thicknesses of the second copper layer and the second plated copper layer lying in the WPC coil area is equal to or greater than 55 micrometers; a thickness of the second copper layer lying in the NFC coil area is equal to or less than 35 micrometers; a thickness of the second copper layer being etched and lying in the matching line area is equal to or less than 18 micrometers.

* * * * *

UNITED STATES PATENT AND TRADEMARK OFFICE
CERTIFICATE OF CORRECTION

PATENT NO. : 10,205,487 B1
APPLICATION NO. : 15/870882
DATED : February 12, 2019
INVENTOR(S) : Ming-Jaan Ho, Xian-Qin Hu and Fu-Yun Shen It is certified that error appears in the above-identified patent and that said Letters Patent is hereby corrected as shown below:

On the Title Page

Please replace Item (73) regarding "Assignees" with the following:
(73) Assignees: Avary Holding (Shenzhen) Co., Limited, Shenzhen (CN);
HongQiSheng Precision Electronics (QinHuangDao) Co., Ltd., Qinhuangdao (CN)

Signed and Sealed this
Twenty-first Day of July, 2020

Andrei Iancu
*Director of the United States Patent and Trademark Office*